United States Patent [19]

Voorman

[11] Patent Number: 4,647,790
[45] Date of Patent: Mar. 3, 1987

[54] DATA SIGNAL CORRECTION CIRCUIT

[75] Inventor: Johannes O. Voorman, Eindhoven, Netherlands

[73] Assignee: U.S. Philips Corporation, New York, N.Y.

[21] Appl. No.: 745,557

[22] Filed: Jun. 17, 1985

[30] Foreign Application Priority Data

Jun. 29, 1984 [NL] Netherlands ............ 8402071

[51] Int. Cl.$^4$ .................................. H03K 5/08
[52] U.S. Cl. ...................... 307/264; 307/236; 307/359; 307/555; 328/164
[58] Field of Search ............. 307/264, 236, 268, 555, 307/359; 328/164

[56] References Cited

U.S. PATENT DOCUMENTS 4,333,158  6/1982  Voorman ............................ 307/493
4,377,759  3/1983  Ohhata et al. ...................... 307/264
4,449,061  5/1984  Yasuda et al. ...................... 328/164

Primary Examiner—John Zazworsky
Attorney, Agent, or Firm—Thomas A. Briody; Jack Oisher; William J. Streeter

[57] ABSTRACT

In a data correction circuit which can, for example, be used as an output circuit of an echo cancelling circuit for a teletext signal, a correction signal with which a level correction circuit and an amplitude correction circuit are controlled is obtained from an output of a sign-determining circuit. By means of a zero-crossing detection circuit the sign-determining circuit is switchable from a three-level sign-changing function in a normal operating mode in which zero-crossings are detected, to a one-level sign-changing function in a mode in which no zero-crossing detection circuit are detected; in that case the amplitude correction circuit is changed-over to a constant amplification.

6 Claims, 3 Drawing Figures

DATA SIGNAL CORRECTION CIRCUIT

BACKGROUND OF THE INVENTION

The invention relates to a data signal correction circuit comprising an amplitude correction circuit, a level correction circuit and a signal path, coupled to an output of the level correction circuit, for obtaining a correction signal. The signal path comprises a sign-determining circuit. The amplitude correction circuit and the level correction circuit are controllable by the correction signal and the amplitude correction circuit is switchable by an output signal of a zero-crossing detection circuit coupled to the signal path.

IEEE Transactions on Consumer Electronics, Vol. CE 27, August 1981, pages 512-529 disclose a data signal correction circuit of the above type. Therein, the correction signal is obtained with the aid of a difference-determining circuit to which the output signal of the level correction circuit is applied, on one hand, directly and, on the other hand through the sign-determining circuit which is constituted by a double-sided limiter and followed by the amplitude correction circuit.

It is an object of the present invention to provide a data signal correction circuit with a higher degree of accuracy.

According to the present invention, in a data signal correction circuit of the type described above, the correction signal is obtained from an output of the sign-determining circuit, and the sign-determining circuit is switchable by the zero-crossing detection circuit between a three-level sign-changing function in a normal operating mode and a one-level sign-changing function in the mode in which no zero crossings are detected, and the amplitude correction circuit is switchable by the zero-crossing detection circuit to a non-controlled amplification differing from zero, in the operating mode in which no zero crossings are detected.

Applicants have found that a difference in the time delay of the two signal paths to the difference determining circuit may produce deviations in the corrected signal in the prior art correction circuit. By using the sign-determining circuit which, in the normal operating mode, has a three-level sign-changing function, the signal path for obtaining the correction signal may be of a signal construction, as a result of which said time delay differences are eliminated.

The present invention is further based on the recognition that a sign-determining circuit with a three-level sign-changing function has a function sgn (sgn y-y) for the correction signal, where y is the input signal of the sign-determining circuit. Such a correction signal function is suitable for use in control systems of a data signal correction circuit.

In the undesired condition, in which no zero crossings are detected, the circuit is blocked when there is an input signal, which indicates that the level of the output signal of the level correction circuit is incorrect. After the absence of zero crossings has been detected, the correction signal function is temporarily switched to $-\text{sgn } y$ by which the level correction circuit can correct the level and whereby the blocking is eliminated. The invention will now be described in greater detail by way of example with reference to the accompanying drawings in which:

DESCRIPTION OF THE PREFERRED EMBODIMENTS

Figure 1:
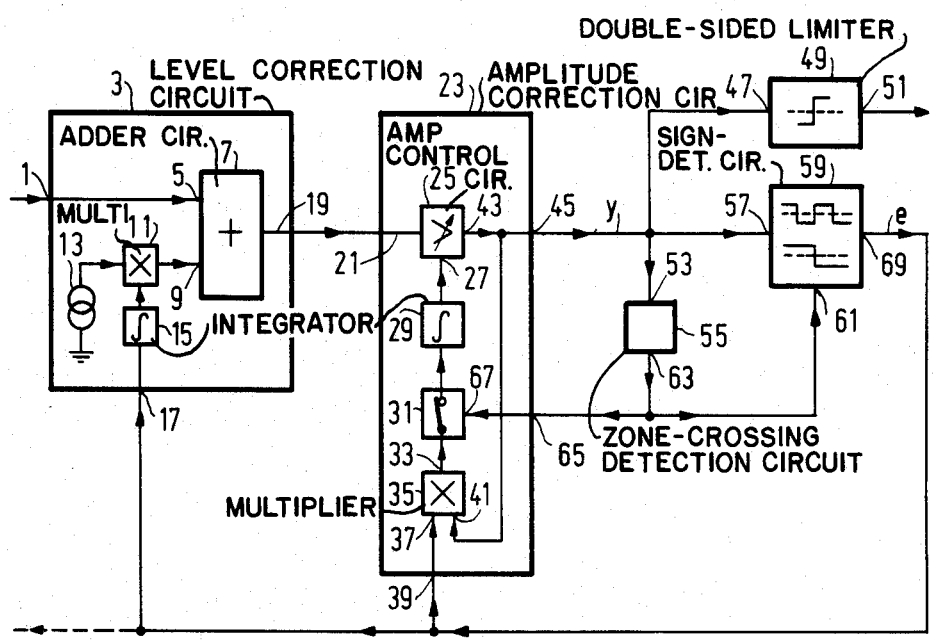
FIG. 1 illustrates in a block circuit diagram a data signal correction circuit according to the present invention.

In FIG. 1, a data signal to be corrected is applied to an input 1 of the data signal correction circuit, which at the same time constitutes the input of a level correction circuit 3. The data signal may, for example, be a teletext signal or any other binary signal.

Input 1 of the level correction circuit 3 is connected to an input 5 of an adder circuit 7, to another input 9 of which a level correction signal is applied. This level correction signal is obtained from a multiplier 11 to which a constant current, produced by a current source 13, and a correction signal, integrated by an integrator 15, are applied. This correction signal is applied to an input 17 of the level correction circuit 3.

The adder circuit 7 has an output 19 which also constitutes the output of the level correction circuit 3. This output 19 is connected to an input 21 of an amplitude correction circuit 23.

The amplitude correction circuit 23 comprises an amplitude control circuit 25 whose input is the input 21 of the amplitude correction circuit. A control signal input 27 of the amplitude control circuit 25 is connected to an output 33 of a multiplier 35 through an integrator 29 and a switch 31. An input 37 of this multiplier 35 receives the correction signal from an input 39 of the amplitude correction circuit, while a further input 41 is connected to an output 43 of the amplitude control circuit 25, which is also connected to the signal output 45 of the amplitude correction circuit 23.

The output 45 of the amplitude correction circuit 23 is connected to an input 47 of a double-sided limiter 49, an output 51 of which forms the output of the data signal correction circuit, to an input 53 of a zero-crossing detection circuit 55 and to an input 57 of a switchable sign-determining circuit 59. A change-over signal input 61 of the sign-determining circuit 59 is connected to an output 63 of the zero-crossing detection circuit 55. This output 63 is connected to a control signal input 67 of the switch 31 through an input 65 of the amplitude correction circuit 23.

An output 69 of the sign-determining circuit 59 applies the correction signal e to the input 17 of the level correction circuit 3 and to the input 39 of the amplitude correction circuit 23.

In the normal operating mode which occurs when the zero-crossing detection circuit 55 detects zero crossings in its input signal y, this correction signal e is a function of y which at three levels of y has a sign change and which can be written as $e = \text{sgn (sgn } y-y)$.

In this normal operating mode the switch 31 is closed, so that with this correction circuit both an amplitude correction through the amplitude correction circuit 23 and a level correction through the level correction circuit 3 are performed on a signal applied to the input 1 of the circuit.

If the zero-crossing detection circuit 55 has not detected zero crossings for some time, then switch 31 is opened and the function of the sign determining circuit becomes e = −sgn y. The integrator 29 of the amplitude correction circuit 23 now remembers the last-obtained value of the output signal of the multiplier 35, causing the gain of the amplitude control circuit 25 to be constant and different from zero. Now the level of the signal y is recovered again through the level correction circuit 3 until zero crossings have again occurred during some time.

The operation and the possible construction of the level correction circuit 3, the double-sided limiter 49 and the amplitude control circuit 23 are described in the above-mentioned article and in U.S. Pat. No. 4,333,158, so that no further description is given here.

The switch 31 is shown as a separate switch but may, for example, form a part of the multiplier 35.

The signal at the input 41 of the multiplier 35 can be taken from the output 51 or through a double-sided limiter, from the input 21 of the amplitude correction circuit 23.

The zero-crossing detection circuit 55 may receive the output signal of the level correction circuit 3 as an input signal.

The switch 31 may be constructed as a change-over switch, so that the operating mode in which no zero-crossings are detected a fixed voltage is applied to the integrator 29 in response to which the amplitude control circuit always has a predetermined gain in this operating mode.

The signal paths may be of a balanced or a non-balanced construction.

The data signal correction circuit may be used as an output circuit of a self-adjusting transversal, recursive or transversal and recursive filter. The correction signal e can then also be used as an error signal for setting the filter coefficients, for example as described in the above-mentioned publications. In that case the output signal of the amplitude correction circuit 23 may already have the desired waveform, so that the double-sided limiter 49 may then be omitted.

The amplitude control circuit 25 of the amplitude correction circuit 23 can optionally be included elsewhere in the circuit, for example before the level correction circuit 3 or at a self-adjusting filter circuit, for example for each tap of a delay circuit used therein.

Figure 2:
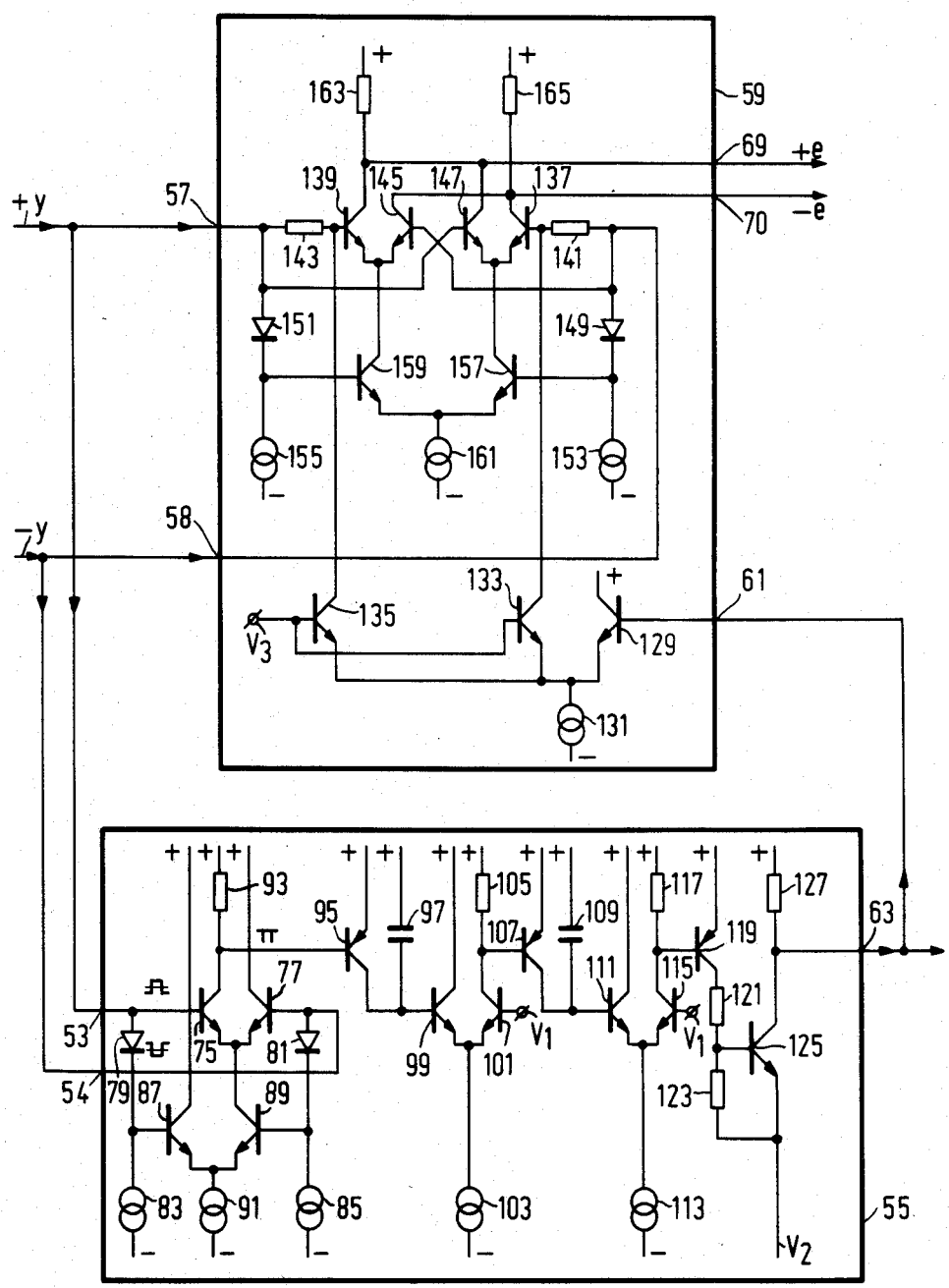
FIG. 2 illustrates a circuit diagram of one embodiment of a portion of a data signal correction circuit according to the present invention.

In FIG. 2, in which corresponding components have been given the same reference numerals as in FIG. 1, a possible construction of the zero-crossing detection circuit 55 and the switchable sign-determining circuit 59 are shown.

The input signal y may be assumed to be a balanced signal. The signal +y is applied to the input 57 of the sign-determining circuit 59 and to the input 53 of the zero-crossing detection circuit 55 and the signal −y which is balanced therein, with respect to a predetermined level, is applied to an input 58 of the sign determining circuit 59 and to an input 54 of the zero-crossing detection circuit 55. The correction signal is also in the balanced state and is obtained as +e at the output 69 and as −e at an output 70 of the sign-determining circuit 59.

The inputs 53 and 54 of the zero-crossing detection circuit 55 are connected respectively to the base of transitors 75 and 77. Level shifting circuits comprising diodes 79 and 81, respectively, and current sources 83 and 85, respectively, are connected to the bases of transistors 87 and 89, respectively.

The emmiters of the transistors 75 and 77 are connected to the collector of the transistor 89, the emitter of which is connected to the emitter of the transistor 87 and to a current source 91. The collector of the transistor 75 is connected to a positive voltage through a resistor 93 and is further connected to the base of a pnp-transistor 95.

If the input 53 is highly positive relative to the input 54, then the transistor 87 carries the total amount of current supplied by the current source 91 and the collector of the transistor 75 attains the supply voltage. If the input 53 is highly negative relative to the input 54, then the transistors 89 and 77 carry the entire amount of current produced by the current source 91 and the collector of the transistor 75 again attains the supply voltage. If the voltages at the inputs 53 and 54 are equal, then the transistors 75 and 77 each carry a quarter of the current produced by the current source 91 and a voltage drop is produced across the resistor 93. At each zero crossing of the signals at the inputs 53, 54 a negative voltage pulse occurs consequently at the base of the transistor 95 relative to its emitter connected to the positive supply voltage.

The collector of the transistor 95 is connected to a capacitor 97, whose other side is connected to the positive supply voltage, and to the base of a transistor 99. The emitter of the transistor 99 is connected to the emitter of a transistor 101 and to a current source 103. The base of the transistor 101 is connected to an appropriate voltage $V_1$ and the collector is connected through a resistor 105 to the positive supply voltage and to the base of a pnp-transistor 107.

If no voltage pulses are produced across the resistor 93, the transistor 95 is in the non-conducting state and the capacitor 97 is charged by the base current of the transistor 99, as a result of which also the transistor 99 is cut-off and a voltage drop is produced across the resistor 105 in response to the current produced by the current source 103 and carried by the transistor 101. The transistor 107 then consumes current, as a result of which a capacitor 109 one side of which is connected to the collector of this transistor and the other side to the supply voltage attains such a charge that the voltage across it becomes approximately equal to zero. The base of a transistor 111 connected to the capacitor 109 also attains that voltage. The emitter of this transistor 111 is connected to current source 113 and to the emitter of a transistor 115, whose base is connected to the voltage $V_1$, and whose collector through a resistor 117 to the positive supply voltage and to the base of a transistor 119.

The voltage at the base of the transistor 111 is now such that all the current from the current source 113 flows through the transistor 111. Consequently, the transistor 119 does not consume current, so that no voltage drop is produced across a series arrangement of two resistors 121, 123, provided in its collector circuit, which are connected to voltage $V_2$. The junction of the resistors 121 and 123 is connected to the base of a transistor 125, which then consumes no current as a result of which its collector, which is connected to the positive supply voltage through a resistor 127, becomes high and the output 63 of the zero-crossing detection circuit 55 connected thereto also becomes high.

If zero crossings occur at the inputs 53, 54, the voltage at the base of the transistor 99 increases in response to a discharge of the capacitor 97. The transistor 99 then starts carrying the current from the current source 103, the transistor 101 is cut-off, as is also the transistor 107, and the capacitor 109 is charged in response to the base current of the transistor 111 until this transistor 111 becomes non conductive and the transistor 115 carries the current from the current source 113, which causes the transistor 119 to consume current, and also the transistor 125, and the voltage at the output 63 to become low.

In this situation the time constant of the capacitor 109 with the base current of the transistor 111 determines how soon after the occurrence of zero-crossings the output 63 is adjusted to the low state. When the zero-crossings disappear the time constant of the capacitor 97 with the base current of the transistor 99 determines how soon after the disappearance of the zero-corssings the output 63 becomes high.

The input 61, connected to the output 63 of the zero-crossing detection circuit 55, of the switchable sign-determining circuit 59 is connected to the base of a transistor 129, whose emitter is connected to a current source 131 and to the emitter of two transistors 133 and 135, respectively, whose bases are connected to an appropriate voltage $V_3$ and whose collectors are connected to the bases of transistors 137 and 139, respectively, and to the inputs 58 and 57, respectively, through resistors 141 and 143. The inputs 58 and 57 are further connected to the bases of the transistors 145 and 147, respectively. Level-shifting circuits comprising diodes 149 and 151, respectively, and current sources 153 and 155, respectively, are connected to the bases of transistors 157 and 159, respectively.

The emitters of the transistors 137, 147 and 139, 145, are connected to the collectors of the transistors 157 and 159, respectively. The emitters of the transistors 157 and 159 are connected to a current source 161. The collectors of the transistors 139 and 137 are connected to the outputs 69 and 70, respectively, to the collectors of the transistors 147 and 145, respectively, and to the positive supply voltage through resistors 163 and 165, respectively.

If the zero-crossing detection circuit 55 does not detect zero crossings, then the transistor 129 is conductive and the transistors 133 and 135 are in the non-conducting state, so that substantially no voltage drop is produced across the resistors 141 and 143.

If then the voltages at the inputs 57 and 58 are equal, the voltages at the bases of the transistors 157 and 159 are equal and also those at the bases of the transistors 137, 139, 145 and 147, which then each carry one quarter of the current produced by the current source 161. The voltages at the outputs 69 and 70 are then also equal.

If now the voltage at the input 57 becomes higher than that at the input 58, the transistor 159 starts carrying more current than the transistor 157 and the transistors 139 and 147, respectively start carrying more current than the transistors 145 and 137, respectively. As a result thereof, the voltage drop across the resistor 136 increases rapidly with an increasing voltage difference at the inputs 57 and 58 and the voltage difference across the resistor 165 decreases rapidly. Inversely, for a voltage at the input 57 which becomes lower than the voltage at the input 58, the voltage at the output 69 becomes rapidly higher and that at the input 70 becomes rapidly lower.

At a small change in the voltage difference at the inputs 57 and 58, the voltages at the outputs 69 and 70 vary between their maximum and minimum values which then remain constant for larger voltage differences at the inputs 58 and 58. The voltage at the output 69 relative to the voltage at the output 70 consequently represents the inverted sign of the voltage at the input 57 relative to that at the input 58. This sign is only changed in the event of a zero-crossing in the signal at the input 57 relative to that at the input 58.

If the zero-crossing detection circuit 55 detects zero crossings, then the transistor 129 is rendered non-conductive, as a result of which the transistors 133 and 135 produce a voltage drop across the resistors 141 and 143, Consequently, the transistors 137 and 139 are rendered non-conductive if the voltage difference between the inputs 57 and 58 is below a predetermined value. Thus, in that range of voltage differences only the current of the transistor 147 flows through the resistor 163, and the current of the transistor 145 through the resistor 165. The current through the transistor 159 and current through the transistor 147 is equal to the current through the transistor 157. The current distribution between these transistors 157 and 159 is determined by the voltage difference between the inputs 57 and 58. If the voltage at the input 57 becomes higher than the voltage at the input 58, then the transistor 159 starts to consume more current than the transistor 157, in response to which the voltage at the output 69 becomes higher than at the output 70. When there is a very low voltage difference between the input 57 and 58, then all the current starts flowing through the transistor 159 and the transistor 157 is rendered non-conductive. If the voltage at the input 57 becomes so much higher that the voltage at the base of the transistor 139 becomes approximately equal to the voltage at the base of the transistor 145, then the current distribution between the transistors 139 and 145 cause the voltage to decrease at the output 69 and the voltage increases at the output 70, so that the sign of the voltage difference between the outputs 69 and 70 is changed. Similarly, it will be obvious that the sign of that voltage is changed when the voltage at the input 57 becomes so much lower than the voltage at the input 58 that the voltages at the bases of the transistors 137 and 147 are approximately equal. Thus, at three levels of the voltage difference at the inputs 57 and 58, the outputs 69 and 70 show a sign change and outside these levels they have a constant value which represents the sign of the difference between the sign of y and y (e=sign y-y).

For the sake of clarity, the drawing shows two level-shifting circuits 151, 155 and 79, 83, respectively, where one would be sufficient. This also applies to the level-shifting circuits 149, 153 and 81, 85, respectively.

Figure 3:
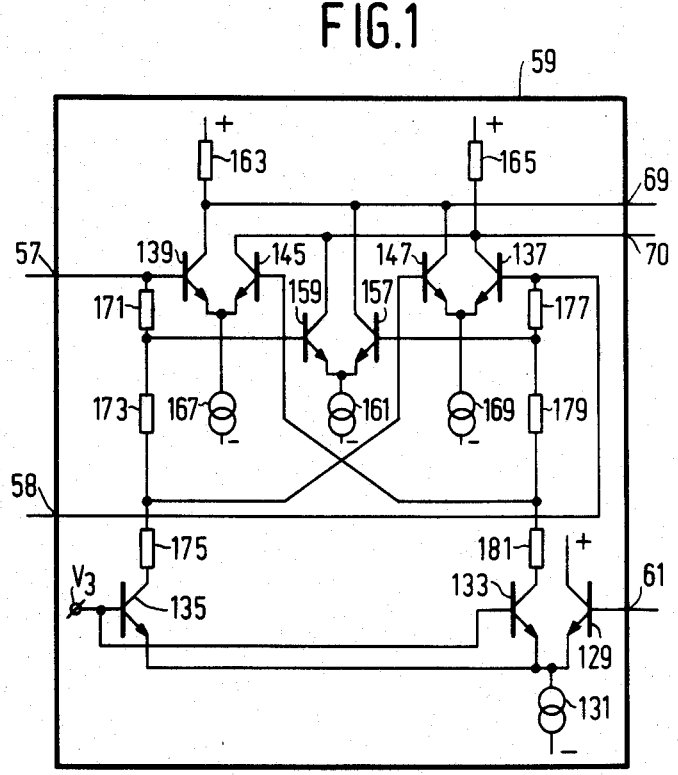
Fig. 3 illustrates a circuit diagram of another embodiment of a portion of the circuit of FIG. 2.

FIG. 3, in which components which correspond to those in FIG. 2 are given the same reference numerals, shows an alternative embodiment of the sign-determining circuit 59.

The emitter-coupled pairs of transistors 139, 145 and 137, 147 here comprise each a respective current source 167 and 169, which produces a constant direct current which is equal to the current applied by the current source 161 to the emitter-coupled pair of transistors 157, 159.

The base of the transistor 139 is connected to the input 57 and the base of transistor 137 to the input 58 of the sign-determining circuit 59.

A series arrangement of three resistors 171, 173, 175 is connected between the input 57 and the collector of the transistor 135 and a series arrangement of three resistors 177, 179, 181 is connected between the input 58 and the collector of the transistor 133.

The base of the transistor 159 is connected to the junction of the resistors 171 and 173, the base of the transistors 147 to the junction of the resistors 173 and 175, the base of the transistor 157 to the junction of the resistors 177 and 179 and the base of the transistor 145 to the junction of the resistors 179 and 181.

The collector of the transistors 157 is connected to the output 69 and the collector of the transistor 159 to the output 70.

When the transistors 133 and 135 are in the non-conducting state, the same base voltage is applied from the input 57 to the transistors 139, 159 and 147 and the same base voltage from the input 58 to the transistors 137, 157 and 145. As a result thereof, the pairs of transistors 137, 147 and 157, 159 oppose each other, so that only the pairs of transistors 139, 145 are active for the output signal. Then, sign change only occurs in the output signal between the output 69 and 70 at one level of the input signal between the inputs 57 and 58.

If the transistors 133 and 135 conduct, the voltage at the base of the transistor 159 is lower than that at the input 57 and consequently at the base of the transistor 139, and the voltage at the base of the transistor 147 is even somewhat lower still. In addition, the voltage at the base of the transistor 157 is somewhat lower than the voltage at the input 58 and at the base of the voltage 137 and the voltage at the base of the transistor 145 is somewhat lower still. It will then be obvious that, as also in the sign-determining circuit of FIG. 2, sign change occurs in the signal at the outputs 69, 70 at three levels of the signal between the inputs 57 and 58.

What is claimed is:

1. A data signal correction circuit comprising:
    a level correction circuit having a data input and data output, and a control input;
    an amplitude correction circuit having an input connected to said level correction circuit data output, said amplitude correction circuit switchable between a normal variable gain mode to a fixed gain mode; said level correction circuit and amplitude correction circuit forming a data signal path;
    a sign determining circuit connected to said signal path for providing a control signal to said level correction circuit and said amplitude correction circuit, said sign determining circuit being switchable from a three level sign changing function in a normal mode to a one level sign changing function; and
    a zero crossing detector connected to said path for providing a switching signal to said amplitude correction circuit for switching said amplitude correction circuit to a fixed gain mode; and for providing a switching signal to said sign determining circuit for switching said sign determining circuit to a one level sign changing function when no zero crossings are detected.

2. A data signal correction circuit as claimed in claim 1 wherein said signal path for said correction signal, considered from an output of said level-correcting circuit comprises, arranged one after the other, said amplitude correction circuit and said sign-determining circuit.

3. A data signal correction circuit according to claim 1 where said sign determining comprises:
    first and second inputs forming a balanced input;
    first and second outputs forming a balanced output;
    a first pair of transistors having common emitter connections connected to receive a first emitter current, the base of one of said transistors connected to one of said inputs, the collector of said one transistor connected to said first output, the collector of the other of said transistors connected to said second output, said other transistor having a free base;
    a second pair of transistors having common emitters receiving a second emitter current; one of said transistors having a base connected to said second input, and a collector connected to said first output, the other of said transistors having a collector connected to said second output and a free base;
    a third pair of emitter and base coupled transistors, each of said transistors having a collector connected to one of said other transistor free bases; said third pair of transistors receiving on their connected emitters the switching signal from said zero crossing detector.

4. The data signal correction circuit of claim 3 further comprising:
    a fourth pair of transistors, each having a collector connected to supply said first and second emitter currents to said first and second pairs of transistors and first and second level shifting circuits for connecting each base of said fourth pair of transistors to said first and second input.

5. The data signal correction circuit of claim 1 wherein said zero crossing detection circuit comprises:
    a balanced input having first and second terminals;
    a first pair of transistors having connected emitters, and bases connected to said first and second terminals;
    a second pair of transistors having connected emitters for receiving an emitter current, the bases of said transistors connected through level shifting circuits to said bases of said first transistor pair, a collector of one of said transistors connected to supply an emitter current to said first pair of transistors, a collector of one of said first pairs of transistors suppling a pulse for each zero crossing detected.

6. The data signal correction circuit of claim 5 further comprising:
    first and second delay circuits serially connected to said pulse producing collector of one of said first pairs of transistors, said delay circuit controlling the delay of the appearance and disappearance of each pulse representing a zero crossing.

* * * * *

UNITED STATES PATENT AND TRADEMARK OFFICE
CERTIFICATE OF CORRECTION

PATENT NO. : 4,647,790

DATED : March 3, 1987

INVENTOR(S) : Johannes O. Voorman

It is certified that error appears in the above-identified patent and that said Letters Patent is hereby corrected as shown below:

IN THE CLAIMS

Claim 1, line 17    insert --signal-- after "said"

Signed and Sealed this

Twenty-ninth Day of November, 1988

Attest:

DONALD J. QUIGG

Attesting Officer

Commissioner of Patents and Trademarks